United States Patent [19]

Lewis

[11] 4,225,952

[45] Sep. 30, 1980

[54] MARINE DEPTH SOUNDING APPARATUS

[76] Inventor: Frank D. Lewis, 5325 Riverview Rd. NW, Altanta, Ga. 30327

[21] Appl. No.: 4,345

[22] Filed: Jan. 18, 1979

[51] Int. Cl.² .............................................. G01S 9/68
[52] U.S. Cl. .................................. 367/112; 367/106; 367/116; 367/910; 340/29
[58] Field of Search ............... 367/106, 112, 116, 910; 340/29

[56] References Cited

U.S. PATENT DOCUMENTS

| | | | |
|---|---|---|---|
| 2,253,975 | 8/1941 | Guanella | 367/100 |
| 2,821,805 | 2/1958 | Kunze | 367/106 |
| 3,018,839 | 1/1962 | Isaacson | 367/27 |
| 3,351,895 | 11/1967 | Cupp et al. | 367/106 X |
| 3,764,962 | 10/1973 | Bartel, Jr. | 367/112 X |
| 3,793,618 | 2/1974 | Plangger | 367/112 |

FOREIGN PATENT DOCUMENTS 1920331 11/1970 Fed. Rep. of Germany .......... 340/3 T Primary Examiner—Richard A. Farley
Attorney, Agent, or Firm—Jones, Thomas & Askew

[57] ABSTRACT

A marine depth sounding apparatus including a floatable housing carrying a sonic transducer for emitting sound waves toward the bottom of a body of water and for detecting the reflections of such sound waves, and a sound transmitter for emitting an audible signal when the information provided by the sonic transducer indicates that the depth of the water is less than a predetermined depth. The apparatus may be cast away from the vessel to provide information concerning the depth of water at locations remote from the vessel. A circuit is disclosed for comparing the time period required for sound waves to travel a distance corresponding to the predetermined depth with the actual time elapsed between the emitting of the sound waves by the sonic transducer and their detection by the sonic transducer.

8 Claims, 2 Drawing Figures

MARINE DEPTH SOUNDING APPARATUS

TECHNICAL FIELD

The present invention relates to sonic depth sounding equipment, and more particularly to a depth sounding apparatus that may be used to determine the depth of a body of water at some distance from a vessel.

BACKGROUND ART

Depth indicators utilizing sonic transducers which have the ability both to emit sound waves and to detect sound waves reflected from the bottom of a body of water, are well known in the art. Such prior art devices, however, have generally been attached to a ship or vessel in order to indicate the depth at the contemporaneous location of the vessel. Thus, although occupants of the vessel could monitor the depth information produced by such a prior art device to determine trends in the depth of the water, such devices cannot provide depth information relating to points distant from the vessel. Such depth information may be useful to operators of small craft that may enter shallow channels of unknown depth or width; previously, it was necessary to cast a sounding line ahead of the craft in an effort to determine whether a safe channel existed. Furthermore, such sonic depth finding devices of the art are subject to disturbances in the water created by the vessel itself, such as vibrations caused by internal machinery or propellers, which may decrease the accuracy of the depth information received.

SUMMARY OF THE INVENTION

The present invention solves the problems of the prior art by providing a depth sounding apparatus capable of providing information relating to the depth of a body of water at points remote from a vessel to the occupants thereof. Generally described, the depth sounding apparatus of the present invention comprises a sonic depth finder in a floatation housing, which can be connected to a line so as to be cast from a boat. The depth finder includes a device which emits a signal when the water depth beneath the floating depth finder is less than a presettable depth. Stated somewhat more particularly, the apparatus of the present invention comprises a watertight housing adapted to float with a predetermined attitude on the surface of a body of water, a means carried by the housing and operative to emit first signals into the body of water so as to provide a second signal which is a function of the depth of water beneath the floating housing, and a means mounted in the housing and operative in response to the second signal to provide a third signal which is audible or otherwise detectable from outside the housing whenever the second signal corresponds to a measured depth which is less than predetermined depth.

The depth sounding apparatus of the invention is preferably attached to a line so that it may be cast away from the vessel and may be retrieved after performing its function of providing depth information. The housing contains a battery to provide a self-sufficient power supply to operate the apparatus, which includes a sonic transducer which emits sound waves toward the bottom of the body of water and detects the sound waves reflected back from the bottom, as well as a transmitter for generating an audible signal when the depth of water is less than a predetermined depth. The components are arranged within the housing so that the center of gravity of the apparatus is located with respect to its center of buoyancy, such that the housing floats in a stable manner with the sonic transducer pointing downwardly into the water. The audible sound transmitter or other operator signal means is located so that it is consistently located above the surface of the water and its signal is thereby transmitted to the occupants of the vessel. The predetermined depth that determines whether an audible signal is heard is variable and may be manually set using a control on the housing before casting the apparatus away from the vessel.

Thus, it will be seen that an occupant of a vessel may utilize a depth sounding apparatus of the present invention to determine depth information concerning a location in the body of water into which the occupant of the vessel wishes to move the vessel, and may do so a sufficient time before the vessel is moved into such location to allow the occupant to prevent the vessel from moving into the location if the water is too shallow to accommodate the vessel. Also, the occupant of a vessel may utilize the depth sounding apparatus of the invention to locate deep holes in the bottom of the body of water where, for example, fish might be located. A wide area of water could be relatively quickly scanned for such holes by casting the apparatus away from the boat and slowly reeling it back, while listening for the absence of an audible sound at particular locations which would indicate water deeper than the depth setting of the apparatus.

It is therefore an object of the present invention to provide a depth sounding apparatus capable of providing depth information relating to a location remote from the vessel.

It is a further object of the present invention to provide a depth sounding apparatus which floats in a predetermined attitude on the surface of a body of water and provides depth information with respect to the body of water at the location of the apparatus.

It is a further object of the present invention to provide a depth sounding apparatus that generates a warning signal when the apparatus is located at a point in a body of water where the depth of the water is less than a predetermined depth.

Other objects, features and advantages of the present invention will become apparent upon reading the following specification when taken in conjunction with the accompanying drawing.

DETAILED DESCRIPTION

Figure 1:
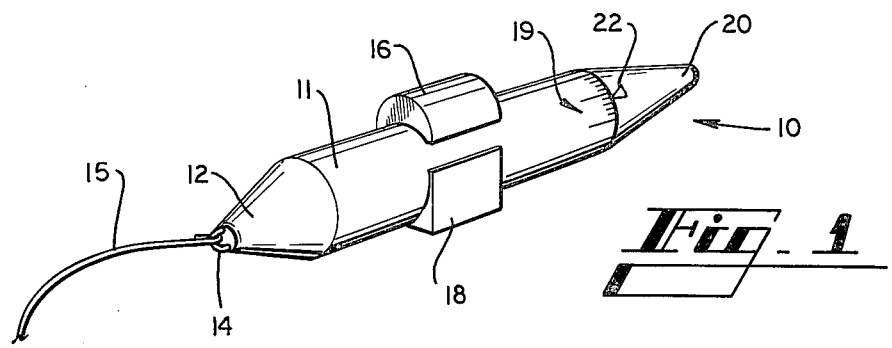
FIG. 1 is a pictorial view of a depth sounding apparatus according to an embodiment of the present invention.

Referring now in more detail to the drawing, in which like parts designate like elements throughout the several views, FIG. 1 shows a depth sounding apparatus 10 according to the present invention. The depth sounding apparatus 10 includes a cylindrical housing 11 which includes a tapered front end 12 carrying a ring 14 at the point thereof for attachment of a casting line 15. At the rear of the housing 11 is located a rotatable tapered member 20. The member 20 may be rotated about an axis corresponding to the longitudinal axis of the housing 11 in order to change the predetermined depth setting of the apparatus, as will be more fully explained below. To accomplish this purpose, a scale 19 is engraved upon the fixed portion of the housing 11 adjacent to a pointer 22 on the rotatable member 20 for indicating the position selected on the scale 19.

Projecting from the top of the housing 11 is a sound transmitter 16, for example, a small speaker, capable of producing an audible sound signal. Similarly projecting from the bottom of the housing 11 opposite the sound transmitter 16 is a sonic transducer 18. The housing 11 is watertight, and its contents are arranged so that the center of gravity of the apparatus is at the bottom thereof, in the vicinity of the sonic transducer 18, and positioned with respect to the center of buoyancy of the apparatus such that the apparatus 10 floats on the surface of water in a particular stable attitude wherein the sonic transducer 18 projects into the water so as to direct ultrasonic waves downwardly in a direction substantially perpendicular to the surface of the water, and the sound transmitter 16 projects into the air above the surface of the water.

The sonic transducer 18 is of a type well known to those skilled in the art. The transducer 18, when activated by an appropriate electrical signal, emits a signal comprising sound waves into the water, and it will be understood by those skilled in the art that such sound waves are typically in the ultrasonic range of frequencies. It will be understood that the sound waves emitted by the transducer 18 will be directed straight toward the bottom of a body of water, because of the predetermined attitude of the housing 11 and the transducer 18 when the apparatus 10 is floating. When the sound waves reflect from the bottom of the body of water and travel upward to the transducer 18, the transducer detects the presence of the sound waves, and in response thereto generates an electrical signal. Thus, if the transducer 18 emits a short pulse of sound waves toward the bottom of the body of water, the pulse will return to the transducer in a period of time that is a function of the depth of water, because the speed of sound in water is a constant known value.

Figure 2:
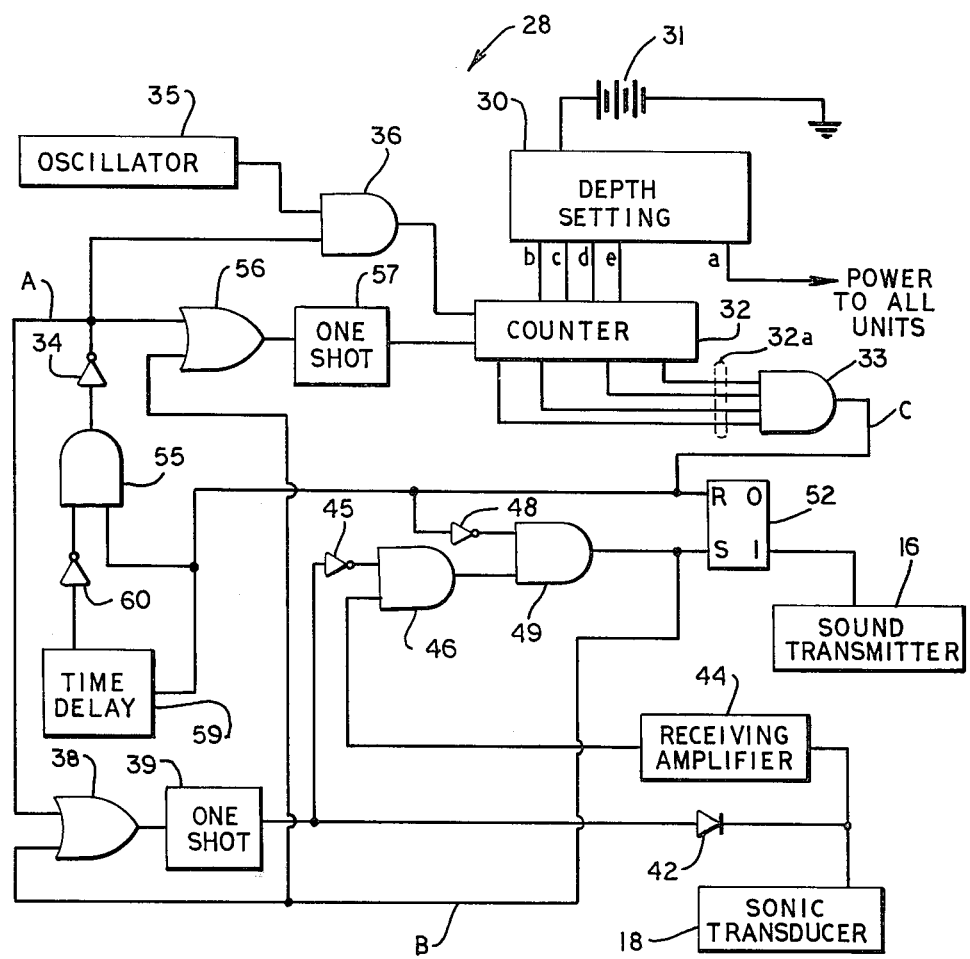
FIG. 2 is a schematic representation of a circuit operative in a depth sounding apparatus of the present invention to provide depth information.

FIG. 2 shows a schematic diagram of a circuit 28 which operates the transducer 18 and the sound transmitter 16 to produce an audible sound when the depth of water beneath the depth sounding apparatus 10 is less than a predetermined depth setting. A depth setting control 30 is a multiple switch operated by rotation of the rotatable member 20 at the end of the housing 11. The switches of the depth setting control 30 are used to connect a power supply in the form of a battery 31 to various components of the circuit, and to indicate the numerals "0" or "1" of a binary number corresponding to a desired minimum depth setting. As disclosed, the depth setting control 30 includes one switch at position a for turning the power from the battery 31 on and off, and four positions b-3 for providing binary states which correspond to selected depth settings in a range from one to fifteen feet. The positions b-e of the depth setting control 30 are connected to a pre-settable binary counter 32 which provides a predetermined electrical signal on each of the lines 32a when the counter has counted electrical pulses equal to the number indicated by the setting of the control 30. Thus, the four lines b-e control the number of pulses that the counter 32 must receive for the counter outputs on the output lines 32a to all be in a "high" logic state after the counter has been reset. When all of the counter outputs are high, a signal is provided through AND gate 33 to a line C.

When position a of the control 30 is switched on, power from the battery 31 is provided to all active elements of the circuit, including an oscillator 35 which provides a pulsed input to the AND gate 36, which thereby sends a pulsed signal to the counter 32, because initially there is no input signal to the inverter 34. The output signal from the inverter 34 also travels along line A to an OR gate 38, which transmits a signal to a one-shot 39 which, as is known to those skilled in the art, produces an output signal of a fixed duration. This output signal from the one-shot 39 proceeds through a diode 42 to the depth transducer 18, which produces a pulse of sound waves 41 for the duration of the pulse from the one-shot 39. The sound waves 41 travel to the bottom G of the body of water and are reflected therefrom and detected subsequently by the transducer 18. At the same time that the sonic pulse is traveling from the transducer 18 to the bottom G and returning to the transducer, pulses from the oscillator 35 are being counted by the counter 32. The pulsed output of the oscillator is timed according to the well known speed of sound in water. Thus, when a particular depth setting is selected at the depth setting control 30, the binary counter 32 is set to count the number of oscillator pulses which the oscillator 35 will generate in the known time required for sound waves to travel twice the selected depth. When the counter 32 has counted pulses corresponding in number to the preset number, all output lines 32a of the counter go high to provide a high output C from the AND gate 33.

The function of the remainder of the circuitry may take one of two forms, depending on whether the sound waves emitted from the depth transducer 18 are detected by the transducer 18 before or after the counter 32 counts out the binary number corresponding to the selected depth. When the sonic transducer 18 detects the return of the sound waves 41, the transducer 18 emits an electrical signal which is amplified by an amplifier 44 and transmitted to an AND gate 46. The diode 42 prevents the signal emitted by the transducer 18 from negating the second input to the AND gate 46, and an inverter 45 located between the output of the one-shot 39 and the AND gate 46 prevents the AND gate 46 from going high while the sonic pulse is being transmitted by the transducer 18. Normally, the one-shot 39 will not be activated when the transducer 18 detects the returning sound waves 41. Therefore the inverter 45 will provide a signal which, along with the amplified signal received by the transducer 18, produces a high output signal from the AND gate 46, providing one input to another AND gate 49.

If the depth of the water is less than the predetermined depth setting of the depth setting control 30, the signal from AND gate 46 will occur before all of the outputs 32a from the counter 32 have gone high to the AND gate 33. Therefore the line C is not energized when the signal corresponding to the returned sonic wave 41 appears on the output from the AND gate 46, and an inverter 48 connected to the line C provides the second high input to the AND gate 49. In such a circumstance, the AND gate 49 provides a signal to the "set" input of a flip-flop 52 which, upon being set, will energize the sound transmitter 16 to provide an audible signal. The signal from the AND gate 49 also energizes a line B which is connected both to the OR gate 38 and to an OR gate 56. The OR gate 56 energizes a one-shot 57 to reset the counter 32 to the number determined by the depth setting switch 30. Since there is still no input signal to the inverter 34, the oscillator 35 will again cause the counter 32 to begin counting out. Simultaneously, the OR gate 38 produces another pulse from the one-shot 39 to energize the depth transducer 18, so as to repeat the process of comparing the time of travel of the sound waves 41 to the time required for the counter 32 to reach the binary number corresponding to the preset depth. Moreover, the process just described will be repeated indefinitely and audible signals will be continuously heard from the sound transmitter 16 until a location is reached where the depth of the water is greater than the preset depth.

In such an instance, the line C will be energized prior to the emission of an electrical signal by the transducer 18 upon detecting the reflected sound waves 41. The energization of line C provides an input to inverter 48 which thereby prevents the signal from the transducer 18 from being transmitted past the AND gate 49. Simultaneously, the signal along the line C, which is connected to the "reset" input of the flip-flop 52, resets the flip-flop, shutting off the sound transmitter 16.

The line C is also connected to one input of an AND gate 55 and to a conventional time delay circuit 59 which, after the time delay which the circuit 59 is designed to provide, sends a signal to an inverter 60 which is connected to the other input of the AND gate 55. Thus, when the line C is energized, a signal is transmitted from the AND gate 55 to the inverter 34 for the duration of the time delay. While the inverter 34 is receiving an input signal, that inverter prevents pulses from the oscillator 35 from passing AND gate 36, and prevents energization of the one-shots 39 and 57 through line A and OR gates 38 and 56, respectively.

The time delay circuit is designed to provide a time delay which allows the reflections of the sound waves to die down before another sonic pulse is generated. After the time delay has passed, the inverter 60 receives a signal from the time delay circuit 59 and prevents the AND gate 55 from allowing a signal to pass to the inverter 34. At this time the inverter 34 provides a signal to the OR gate 56 to reset the counter 32, to the AND gate 36 to allow pulses from the oscillator 35 to reach the counter 32, and to OR gate 38 along line A to energize the one-shot 39 to provide a pulse to the sonic transducer 18 which will then emit another pulse of sound waves 41 toward the bottom G of the body of water.

So long as the depth of the water remains greater than the preset depth, the line C will always be energized before the flip-flop 52 can be set by a signal originating at the sonic transducer 18. While such condition exists, the depth will be repeatedly tested as allowed by the time delay circuit 59. As soon as the depth of the water becomes less than the preset depth, the amplified signal from the transducer 18 will once again pass through the AND gate 49 and set the flip-flop 52 causing the sound transmitter 16 to emit an audible signal, as described hereinabove.

In operation, the occupant of a vessel first rotates the rotatable member 20 to set the depth setting control 30 at the desired predetermined depth and connect the battery 31 to the circuit 28. The occupant then attaches a line 15 to the eyelet 14 at the end of the housing 11 and casts the apparatus 10 away from the vessel. After hitting the surface of the water, the apparatus will float and assume an attitude wherein the transducer 18 is submerged and the sound transmitter 16 is above the surface of the water. Since the power from the battery 31 has previously been turned on, pulses from the sonic transducer 18 will begin traveling toward the bottom of the body of water and will be reflected therefrom and detected by the sonic transducer 18. The sound transmitter 16 will be operative to produce an audible signal which may be heard by the occupant of the vessel if the depth of the water is less than the predetermined depth setting entered on the depth setting control 30.

The occupant of the vessel, having cast out the apparatus, may reel it into the vessel and thereby obtain an approximate profile of the depth of the water along a line between the vessel and the point at which the apparatus first made contact with the water, by listening for any alterations in the output of the sound transmitter 16 while the apparatus is being brought back to the vessel. The occupant of the vessel may use the information received from the depth sounding apparatus 10 of the invention to guide the vessel into areas having a safe depth for the vessel. By casting the apparatus 10 away from the vessel, the occupant may gain knowledge of the depth of the water sufficiently in advance to safely guide the path of the vessel, in contrast to prior art devices capable only of testing the depth immediately below the vessel. The apparatus of the invention may also be used to search for deep holes in the bottom of the body of water where fish might be more likely to be found.

While this invention has been described in detail with particular reference to preferred embodiments thereof, it will be understood that variations and modifications can be effected within the spirit and scope of the invention as described hereinbefore and as defined in the appended claims.

I claim:

1. Marine depth sounding apparatus comprising
    a watertight housing adapted to float with a predetermined attitude on the surface of a body of water;
    means carried by said housing and operative to emit first signals into said body of water so as to generate a second signal which is a function of the depth of water beneath said floating housing; and
    means mounted in said housing and operative in response to said second signal to generate a third signal which is detectable from outside said housing only when said second signal corresponds to a depth which is less than a predetermined depth.

2. The apparatus of claim 1, wherein said first signals are sound wave pulses, and wherein said second signal generating means comprises a sonic transducer operative to emit a sound wave pulse into said water and to sense sound waves, and to convert said sensed sound waves into said second signal.

3. The apparatus of claim 2 wherein said third signal generating means comprises
    a counting means operative during the time required for said first signal pulse emitted from said transducer to travel twice the distance of said predetermined depth; and
    a means responsive to said first signal pulse travelling the depth of said water, returning and being sensed by said transducer while said counting means is still operative, for generating said detectable third signal.

4. The apparatus of claim 1 wherein said third signal comprises audible sound waves.

5. The apparatus of claim 1 further comprising a self-contained power source carried by said housing.

6. The apparatus of claim 1 further comprising a means for selectively varying said predetermined depth.

7. The apparatus of claim 1, further comprising a means for casting said housing from a vessel and for retrieving said housing.

8. A marine depth sounding apparatus comprising:
an audible sound transmitter;
a sonic transducer for transmitting and receiving sound waves in water;
a watertight housing carrying said transmitter and said transducer, said transmitter and transducer being situated with respect to said housing such that said housing floats on water with an attitude wherein said transmitter is above the surface of the water and said transducer is submerged and directed generally vertically downward;
a means for causing said transducer to emit a pulse of sound waves into said water;
a means for monitoring the time required for said pulse to return to said transducer; and
a means, responsive to said time for said pulse to return to said transducer being shorter than a predetermined time period, for operating said transmitter to produce an audible signal.

* * * * *